US012687192B2

(12) United States Patent
Dunn et al.

(10) Patent No.: US 12,687,192 B2
(45) Date of Patent: Jul. 21, 2026

(54) LOCKING PLATE FOR A FASTENER ARRANGEMENT

(71) Applicant: Dodge Industrial, Inc., Oxford, CT (US)

(72) Inventors: Michael Dunn, Piedmont, SC (US); Todd Reid, Mauldin, SC (US)

(73) Assignee: Dodge Industrial, Inc., Oxford, CT (US)

( * ) Notice: Subject to any disclaimer, the term of this patent is extended or adjusted under 35 U.S.C. 154(b) by 0 days.

(21) Appl. No.: 18/119,025

(22) Filed: Mar. 8, 2023

(65) Prior Publication Data

US 2023/0287926 A1 Sep. 14, 2023

Related U.S. Application Data

(60) Provisional application No. 63/318,979, filed on Mar. 11, 2022.

(51) Int. Cl.
*F16B 39/10* (2006.01)
*F16B 39/04* (2006.01)
(52) U.S. Cl.
CPC ............ *F16B 39/103* (2013.01); *F16B 39/04* (2013.01)
(58) Field of Classification Search
CPC ................................. F16B 39/04; F16B 39/10
USPC ................. 411/315, 294, 197, 200, 209, 221
See application file for complete search history.

(56) References Cited

U.S. PATENT DOCUMENTS

| | | | | |
|---|---|---|---|---|
| 268,079 | A | | 11/1882 | Carter |
| 925,067 | A | * | 6/1909 | Zeese ...................... F16B 39/10 |
| | | | | 411/926 |
| 1,158,340 | A | * | 10/1915 | Zile .......................... F16B 39/32 |
| | | | | 411/294 |
| 1,192,717 | A | * | 7/1916 | Walden ................... F16B 39/04 |
| | | | | 411/209 |
| 1,595,026 | A | * | 8/1926 | Sherman ............... F16B 39/108 |
| | | | | 411/926 |
| 1,736,818 | A | * | 11/1929 | Aumack ............. F16L 27/0845 |
| | | | | 411/315 |
| 4,090,545 | A | * | 5/1978 | Ritter, Jr. ................ F16B 39/04 |
| | | | | 411/209 |
| 4,191,042 | A | | 3/1980 | Salter, Jr. |
| 4,505,628 | A | | 3/1985 | Meibuhr |
| 4,735,533 | A | * | 4/1988 | Gallagher ............... F16K 35/00 |
| | | | | 411/119 |
| 4,906,150 | A | | 3/1990 | Bennett |
| 5,481,945 | A | | 1/1996 | Whipple et al. |
| 6,439,616 | B1 | | 8/2002 | Karafillis et al. |
| 7,766,574 | B2 | | 8/2010 | Maffre |

(Continued)

*Primary Examiner* — Flemming Saether
(74) *Attorney, Agent, or Firm* — Ruggiero McAllister & McMahon LLC; Edward L McMahon

(57) ABSTRACT

A locking plate for a locking arrangement includes a body that is defined by a first planar surface and a second planar surface that is opposite the first planar surface. The body has an arcuate shape that extends from a first lateral end to a second lateral end and extends from a radially inward facing edge to a radially outward facing edge. A single elongated curved opening extends through the body from the first planar surface to the second planar surface and extends an intermediate arc length in the body. An anti-rotation feature extends radially inward from the radially inward facing edge. The body has an anti-tilt lobe located proximate one or more of the first lateral end and the second lateral end.

24 Claims, 10 Drawing Sheets

(56) References Cited

U.S. PATENT DOCUMENTS

| | | | | |
|---|---|---|---|---|
| 8,016,531 B2* | 9/2011 | White | ..................... | B60B 27/02 |
| | | | | 301/105.1 |
| 8,591,059 B2 | 11/2013 | Casey et al. | | |
| 8,628,284 B2 | 1/2014 | Martsensson et al. | | |
| 9,272,574 B2 | 3/2016 | Ebert | | |
| 9,527,346 B2 | 12/2016 | Ebert | | |
| 9,599,143 B2* | 3/2017 | Ekmedíc | ............... | F16B 39/108 |
| 9,790,814 B2 | 10/2017 | Henry | | |
| 9,822,666 B2 | 11/2017 | Max et al. | | |
| 9,945,411 B2 | 4/2018 | Harris et al. | | |
| 9,947,151 B2 | 4/2018 | Ellis | | |
| 10,107,324 B1 | 10/2018 | Rode | | |
| 10,781,911 B2 | 9/2020 | Payne et al. | | |
| 11,441,592 B2 | 9/2022 | Kassel et al. | | |
| 2004/0136806 A1 | 7/2004 | Montgomery et al. | | |
| 2011/0291468 A1* | 12/2011 | Rieger | ................... | F16B 39/10 |
| | | | | 411/209 |
| 2017/0326910 A1 | 11/2017 | Ferman et al. | | |
| 2020/0041053 A1 | 2/2020 | Platova et al. | | |

* cited by examiner

LOCKING PLATE FOR A FASTENER ARRANGEMENT

CROSS REFERENCE TO RELATED APPLICATION

This application claims the benefit of prior-filed, U.S. Provisional Patent Application No. 63/318,979, filed on Mar. 11, 2022, the entire contents of which is incorporated herein by reference in its entirety.

FIELD OF THE INVENTION

The present invention is directed to a locking plate for securing the locknut of a mounted bearing that prevents an adapter sleeve or shaft from loosening during operation, and to a fastener locking arrangement incorporating the locking plate.

BACKGROUND

Typically, the locknut of a mounted bearing is secured with a locking plate that prevents the adapter sleeve or shaft from loosening during operation. Such locking plates have an inwardly projecting tab that is configured to fit into a corresponding axial slot in the adapter sleeve or shaft to prevent loosening of the locknut. Although these locking plates may successfully mitigate loosening of the locknut during operation, the locking plates require the use of two or more bolts to fasten the locking plate to the locknut and adapter sleeve or shaft. This makes installing the locking plates a slow and arduous task for users.

Thus, there is a need for an improved locking plate and fastener locking arrangement that addressed the problems described above.

SUMMARY

According to aspects illustrated herein, there is disclosed a locking plate for a fastener arrangement. The locking plate includes a body that is defined by a first planar surface and a second planar surface that is opposite the first planar surface. The body has an arcuate shape that extends from a first lateral end to a second lateral end and extends from a radially inward facing edge (e.g., a curved edge) to a radially outward facing edge (e.g., a curved edge). A single elongated curved opening extends through the body from the first planar surface to the second planar surface and extends an intermediate arc length in the body. An anti-rotation feature extends radially inward from the radially inward facing edge. The body has an anti-tilt lobe located proximate one or more of the first lateral end and the second lateral end.

In some embodiments, the radially inward facing edge has an inner arc length and the radially outward facing edge has an outer arc length. The outer arc length is of a lesser magnitude than that of the inner arc length.

In some embodiments, the outer arc length extends from a first outer end to a second outer end and a first reduced section extends from the first outer end to the first lateral end, and/or the outer arc length extends from a first outer end to a second outer end and a second reduced section extends from the second outer end to the second lateral end.

In some embodiments, the elongated curved opening terminates in a first semicircle contour which has a first center point and terminates in a second semicircle contour which has a second center point.

In some embodiments, the anti-rotation feature is aligned with the first center point of the elongated curved opening.

In some embodiments, the intermediate arc length of the elongated curved opening is defined by a circumferential segment extending between the first center point of the first semicircle contour and the second center point of the second semicircle.

In some embodiments, the anti-rotation feature is located between the first center point and the second center point.

In some embodiments, the intermediate arc length of the elongated curved opening has a first radius of curvature of about 4 inches to about 14 inches and spans an angle of about 25 degrees to about 35 degrees.

In some embodiments, the body has an inner arc length along the radially inward facing edge from the first lateral end to the second lateral end. The inner arc length has a second radius of curvature of about 3.5 inches to about 11.5 inches and spans an angle of about 75 degrees to about 95 degrees.

In some embodiments, the radially outward facing edge has an outer arc length has a third radius of curvature of about 5.5 inches to about 15 inches and spans an angle of about 25 degrees to about 35 degrees.

In some embodiments, the body has an inner arc length along the radially inward facing edge from the first lateral end to the second lateral end. A ratio of the intermediate arc length of the elongated curved opening to the inner arc length is about 1.1 to about 1.4.

According to aspects illustrated herein, there is disclosed a locking arrangement including a locking plate of any of the preceding embodiments, a first fastener, and a second fastener. The first fastener has a bore that extends therethrough. The bore is defined by a radially inward facing surface. The first fastener has an axial end with a plurality of circumferentially spaced holes extending through the axial end. One or more of the holes has a bolt that extends therethrough. A single one of the bolts extends through the elongated curved opening of the locking plate such that the locking plate is secured between the bolt and the axial end. A portion of the second fastener has an exterior surface that is complementary in shape to the radially inward facing surface of the first fastener. The second fastener is disposed at least partially in the bore of the first fastener such that the exterior surface engages the radially inward facing surface. The exterior surface has a receiving opening that extends axially there along. The anti-rotation feature of the locking plate is positioned in the receiving opening for preventing movement of the first fastener relative to the second fastener.

In some embodiments, the holes are spaced apart from one another by a circumferential arc length. The intermediate arc length of the locking plate is less than the circumferential arc length.

In some embodiments, the radially inward facing edge engages (e.g., in threaded engagement) the exterior surface of the second fastener.

In some embodiments, the anti-tilt lobe engages the exterior surface of the second fastener to prevent tilting of the locking plate relative to the first fastener and the second fastener.

In some embodiments, the anti-tilt lobe extends circumferentially to an adjacent one of the bolts. A portion of the anti-tilt lobe extends radially inward of the adjacent bolt to pin the anti-tilt lobe between the adjacent bolt and the exterior surface of the second fastener.

In some embodiments, the axial end of the first fastener includes one or more protrusions that extend outward therefrom. The anti-tilt lobe extends radially inward of one of the protrusions to pin the anti-tilt lobe between the protrusion and the exterior surface of the second fastener.

In some embodiments, the first fastener is a nut with female threads therein.

In some embodiments, the second fastener is a shaft with external shaft threads thereon and the receiving opening is an axial groove therein, or the second fastener is a sleeve with external sleeve threads thereon and the receiving opening is an axial slot extending therethrough.

In some embodiments, the protrusion is a set screw.

Any of the foregoing embodiments may be combined.

BRIEF DESCRIPTION OF THE DRAWINGS

Referring now to the Figures, which are exemplary embodiments, and wherein the like elements are numbered alike.

DETAILED DESCRIPTION

Figure 1:
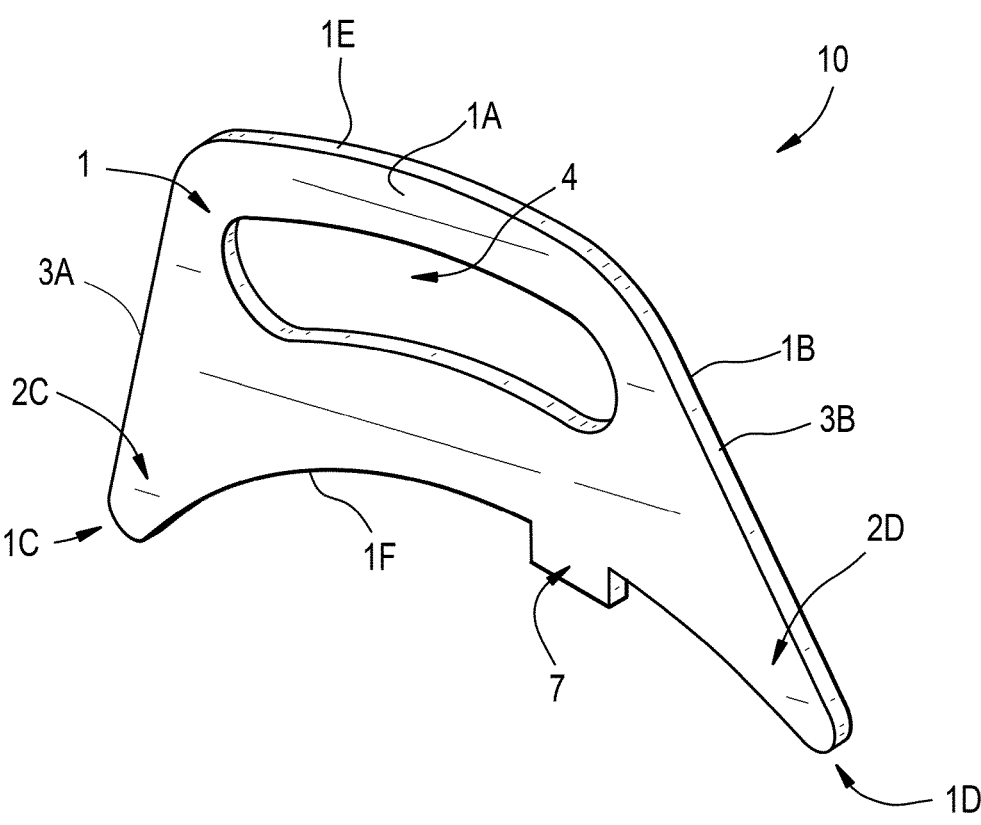
FIG. 1 is an isometric view of a locking plate according to an embodiment of the present invention.
Figure 3:
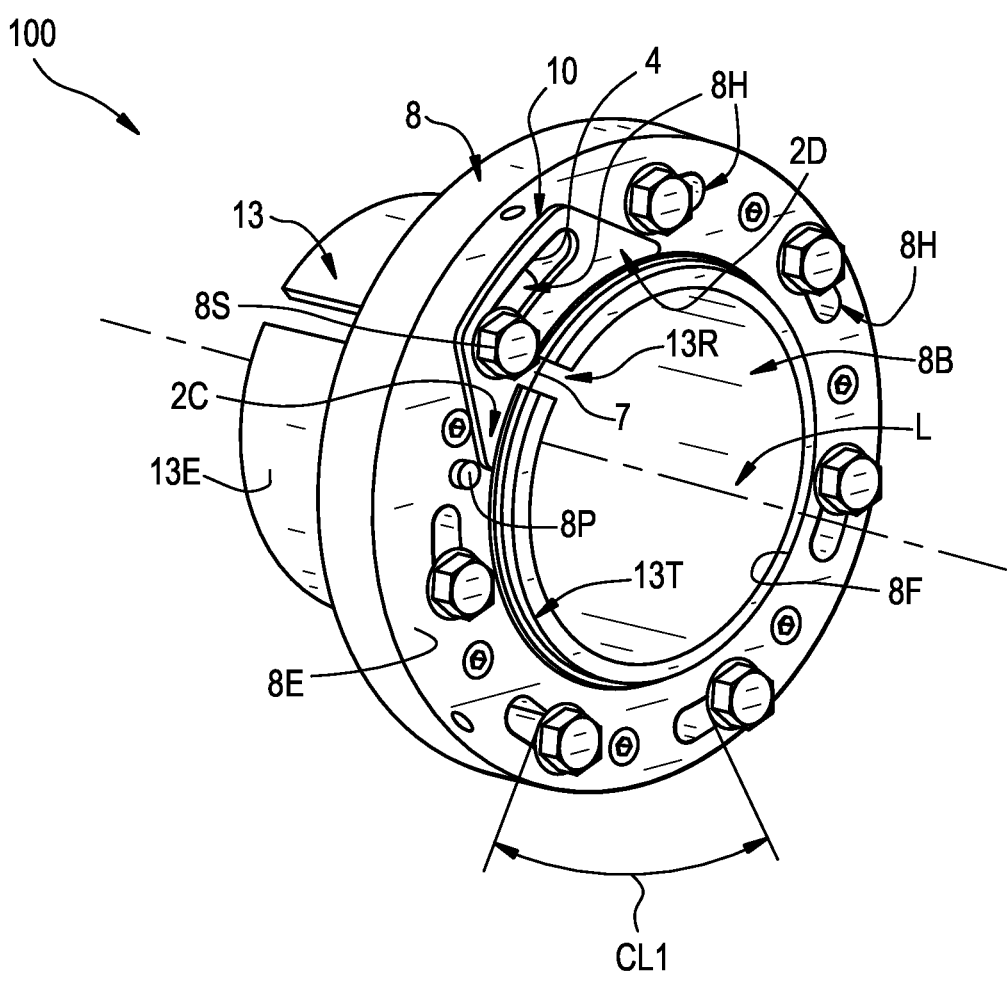
FIG. 3 is an isometric view of a fastener locking arrangement according to an embodiment of the present invention incorporating the locking plate of FIG. 1.
Figure 4:
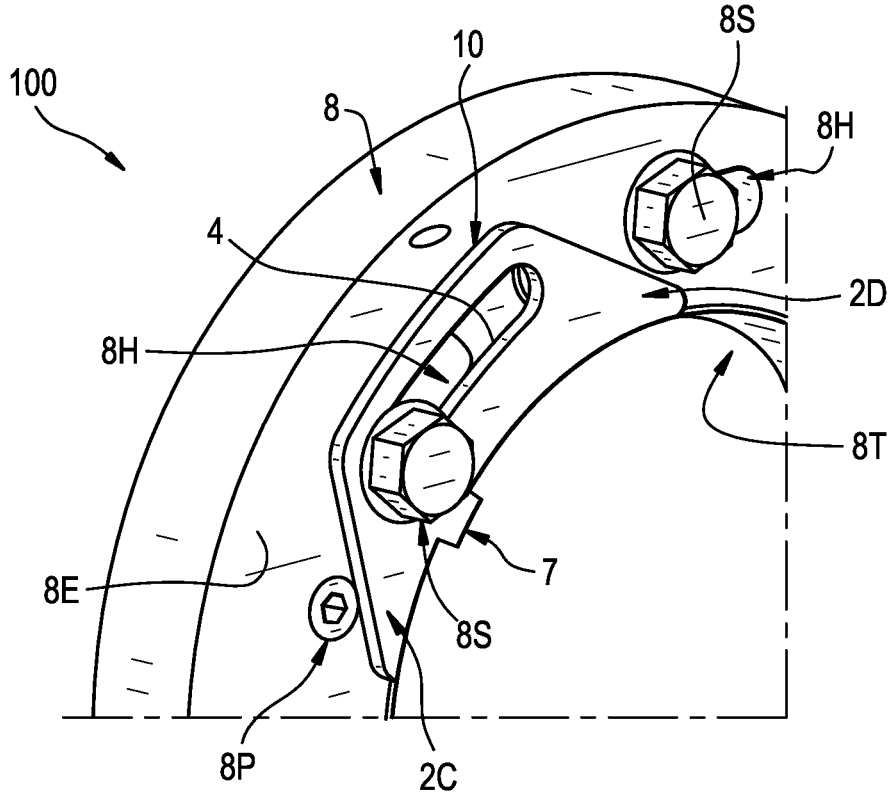
FIG. 4 is a partial enlarged view of the fastener locking arrangement of FIG. 3, showing the locking plate secured to the first fastener without the second fastener.

As shown in FIG. 1, a locking plate for a fastener locking arrangement is generally designated by the numeral 10. The locking plate 10 includes a body 1 that is defined by a first planar surface 1A and a second planar surface 1B that is opposite the first planar surface 1A. The body 1 has an arcuate shape having a radially inward facing edge 1F (e.g., a curved or arcuate shaped edge), a radially outward facing edge 1E (e.g., a curved or arcuate shaped edge), a first lateral facing edge 3A, and a second lateral facing edge 3B. A single elongated curved opening 4 extends through a thickness of the body 1 from the first planar surface 1A to the second planar surface 1B. An anti-rotation feature 7 (e.g., a tab) extends radially inward from the radially inward facing edge 1F of the body 1. The body 1 has a first anti-tilt lobe 2C located proximate a first lateral end 1C at an intersection of the first lateral facing edge 3A and the radially inward facing edge 1F and a second anti-tilt lobe 2D located proximate a second lateral end 1D at an intersection of the second lateral facing edge 3B and the radially inward facing edge 1F. The first anti-tilt lobe 2C and the second anti-tilt lobe 2D are shaped such that, when the locking plate 10 is incorporated into a fastener locking arrangement 100 as discussed herein, the first anti-tilt lobe 2C and the second anti-tilt lobe 2D are pinned between features of the fastener locking arrangement 100 to prevent tilting of the locking plate 10 relative to the other components of the fastener locking arrangement 100. As shown in FIGS. 3-4 and discussed below, the first anti-tilt lobe 2C is configured to be pinned between a protrusion 8P extending from a first fastener 8 (e.g., a locking flange) of the and the exterior surface 13T of a second fastener 13, and the second anti-tilt lobe 2D is configured to be pinned between a bolt 8S in a hole 8H of the first fastener 8 and the exterior surface (13T) of the second fastener 13 to prevent tilting of the locking plate 10 relative to the first fastener 8 and the second fastener 13. As shown in FIG. 1 the anti-rotation feature 7 (e.g., a tab) is parallel to the first planar surface 1A and the second planar surface 1B.

Figure 2A:
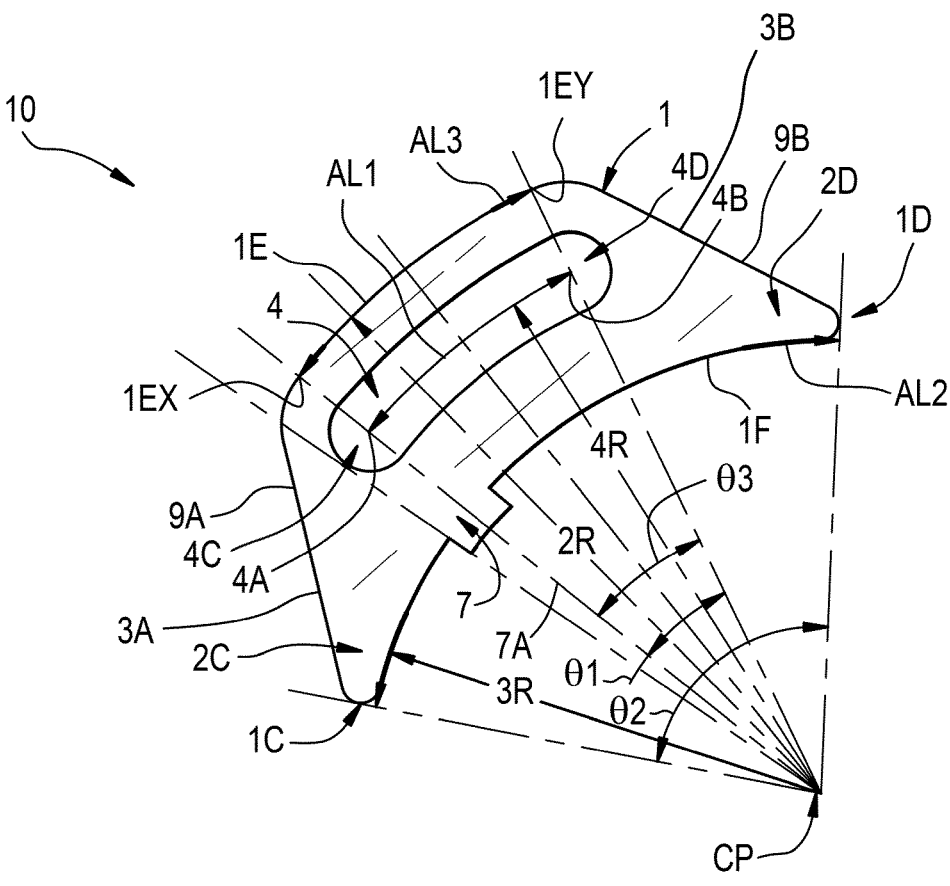
FIG. 2A is a plan view of the locking plate of FIG. 1.

As shown in FIG. 2A, the elongated curved opening 4 extends an intermediate arc length AL1 in the body 1. The elongated curved opening 4 terminates in a first semicircle contour 4C, which has a first center point 4A, and terminates in a second semicircle contour 4D, which has a second center point 4B. The intermediate arc length AL1 of the elongated curved opening 4 is defined by a circumferential segment that extends between the first center point 4A of the first semicircle contour 4C and the second center point 4B of the second semicircle 4D. The intermediate arc length AL1 of the elongated curved opening 4 has a first radius of curvature 4R of about 4 inches to about 14 inches and spans a first angle $\theta 1$ of about 25 degrees to about 35 degrees.

As shown in FIG. 2A, the radially inward facing edge 1F has an inner arc length AL2 thereby curving the radially inward facing edge 1F. The inner arc length AL2 extends along the radially inward facing edge 1F from the first lateral end 1C to the second lateral end 1D. The inner arc length AL2 has a second radius of curvature 3R of about 3.5" to about 11.5" and spans a second angle $\theta 2$ of about 75 degrees to about 95 degrees. A ratio of the intermediate arc length AL1 of the elongated curved opening 4 to the inner arc length AL2 is about 1.1 to about 1.4. While, the radially inward facing edge 1F is shown and described as being curved (e.g., arcuate) the present invention is not limited in this regard as the radially inward facing edge 1F can have other shapes including but not limited to a plurality of discrete interconnecting linear segments.

As shown in FIG. 2A, the radially outward facing edge 1E has an outer arc length AL3 thereby curving the radially outward facing edge 1E. The outer arc length AL3 is of a lesser magnitude than the magnitude of the inner arc length AL2. As used herein in reference to arc lengths, the term "magnitude" refers to the length of the arc length (i.e. the circumferential distance measured between each end of the curve defined by the arc length), the width of the arc length (i.e. the linear distance measured between each end of the chord defend by the arc length), the height of the arc length (i.e. the radial distance measured between the midpoint of the chord and the curve defined by the arc length), or combinations thereof. For example, in some embodiments, the outer arc length AL3 has a smaller length, a smaller width, and/or a smaller height than those of the inner arc length AL2. The outer arc length AL3 extends from a first outer end 1EX at an intersection of the radially outward facing edge 1E and the first lateral facing edge 3A to a second outer end 1EY at an intersection of the radially outward facing edge 1E and the first lateral facing edge 3B. The outer arc length AL3 has a third radius of curvature 2R of about 5.5 inches to about 15 inches and spans a third angle θ3 of about 25 degrees to about 35 degrees. As shown in FIG. 2A, the intermediate arc length AL1, the inner arc length AL2, and the outer arc length AL3 all share a common center point CP. However, the present invention is not limited thereto and contemplates embodiments in which the intermediate arc length AL1, the inner arc length AL2, and the outer arc length AL3 each have separate respective center points or any two of the arc lengths share a common center point.

While, the radially outward facing edge 1E is shown and described as being curved (e.g., arcuate) the present invention is not limited in this regard as the radially outward facing edge 1E can have other shapes including but not limited to a plurality of discrete interconnecting linear segments.

Figure 2B:
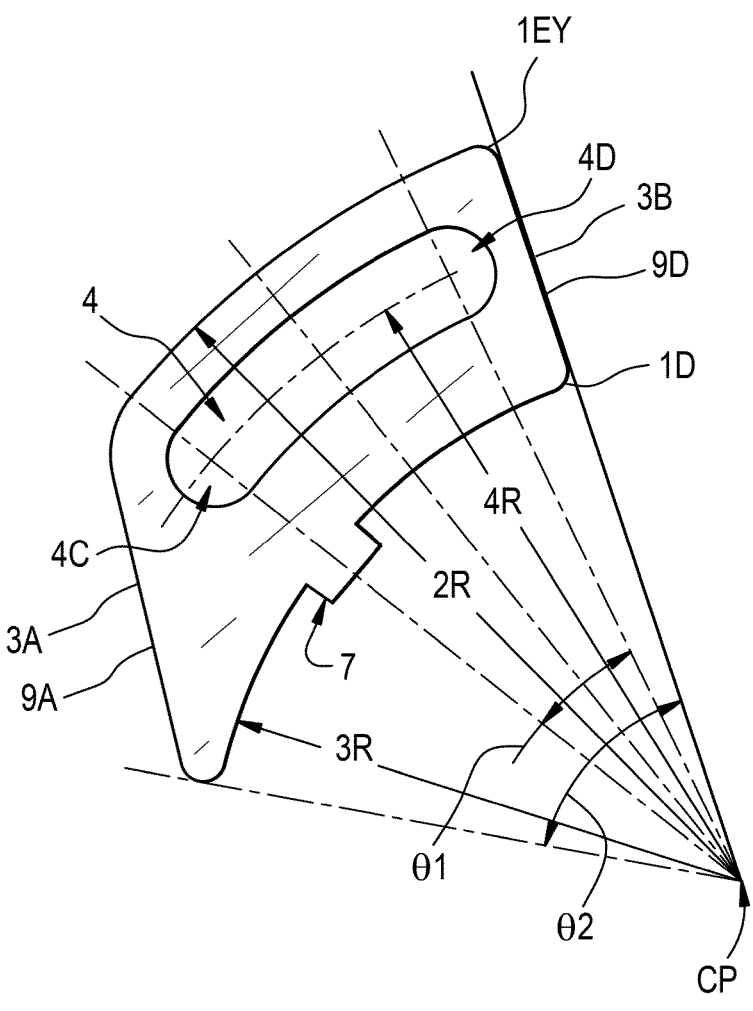
FIG. 2B is a plan view of a locking plate according to an embodiment of the present invention.
Figure 2C:
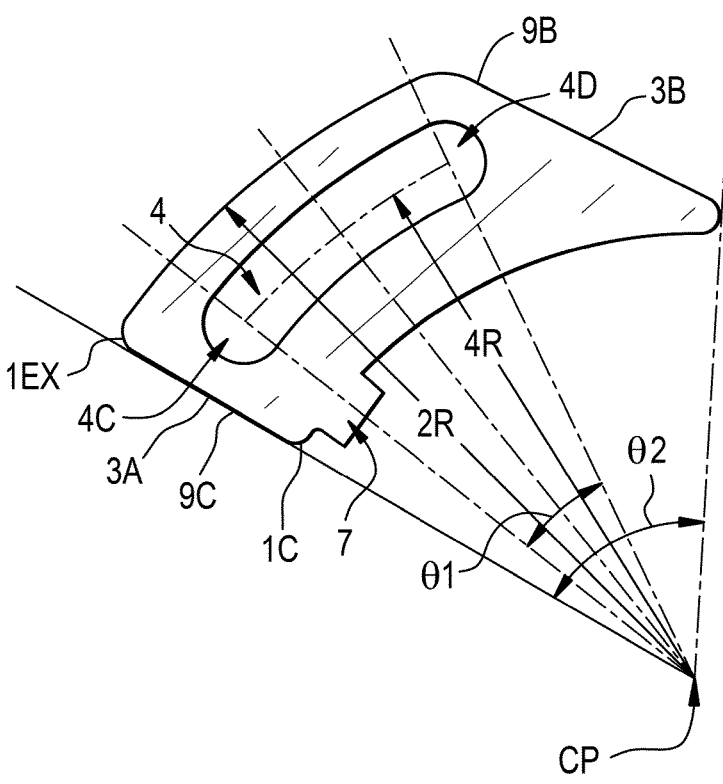
FIG. 2C is a plan view of a locking plate according to an embodiment of the present invention.

As shown in FIG. 2A, a first reduced section 9A extends along the first lateral facing edge 3A from the first outer end 1EX to the first lateral end 1C. A second reduced section 9B extends the second lateral facing edge 3B from the second outer end 1EY to the second lateral end 1D. In some embodiments, the second reduced section 9B is a first radial edge 9C that extends along the first lateral facing edge 3A from the first outer end 1EX to the first lateral end 1C, as shown in FIG. 2C. In some embodiments, the first reduced section 9A is a second radial edge 9D that extends along the second lateral facing edge 3B from the second outer end 1EY to the second lateral end 1D, as shown in FIG. 2B. Although the first reduced section 9A and the second reduced section 9B are shown as having a tapered shape, the present invention is not limited thereto and embodiments in which the first reduced section 9A and the second reduced section 9B have different shapes, such as arcuate shapes, L-shapes, etc., are contemplated, provided that the shape of the first reduced section 9A and the second reduced section 9B permit the first anti-tilt lobe 2C and the second anti-tilt lobe 2D to function as discussed herein.

In some embodiments, the anti-rotation feature 7 is radially aligned with the first center point 4A of the elongated curved opening 4. For example, in the embodiment shown in FIG. 2A, the anti-rotation feature 7 is centrally located along a line 7A connecting the common center point CP and the first center point 4A. In some embodiments, the anti-rotation feature 7 is located between the first center point 4A and the second center point 4B.

As shown in FIG. 3, a locking arrangement is generally designated by the numeral 100. The locking arrangement 100 includes the locking plate 10 as described herein, the first fastener 8 (e.g., a locking flange), and the second fastener 13 (e.g., an expandable and contractible split sleeve). The first fastener 8 has a bore 8B extending therethrough. The bore 8B is defined by a radially inward facing surface 8F. The first fastener 8 has an axial end 8E with a plurality of circumferentially spaced holes 8H extending through the axial end 8E. The holes 8H are spaced apart from one another by a circumferential arc length CL1. The intermediate arc length AL1 of the locking plate 10 is less than the circumferential arc length CL1. One or more of the holes 8H has a bolt 8S extending therethrough. A single one of the bolts 8S extends through the elongated curved opening 4 of the locking plate 10 to secure the locking plate 10 between the bolt 8S and the axial end 8E of the first fastener 8.

As shown in FIG. 3, a portion of the second fastener 13 located in the bore 8B of the first fastener 8 has an exterior surface 13T that is complementary in shape to the radially inward facing surface 8F of the first fastener 8. As shown in FIG. 3, a portion of the second fastener 13 has a tapered exterior surface 13E that is configured to engage a tapered bore (not shown) of an inner ring of a bearing. The second fastener 13 is disposed at least partially in the bore 8B of the first fastener 8 such that the exterior surface 13T engages (e.g., in threaded engagement) the radially inward facing surface 8F. In some embodiments, the radially inward facing surface 8F engages the exterior surface 13T. The exterior surface 13T has a receiving opening 13R (e.g., slot) extending axially there along parallel to a longitudinal axis L of the second fastener 13. The receiving opening 13R extends continuously and entirely from and between opposing axial ends of the second fastener 13. The anti-rotation feature 7 of the locking plate 10 is positioned in the receiving opening 13R to prevent movement of the first fastener 8 relative to the second fastener 13. In some embodiments, the second fastener 13 is a shaft with external shaft threads on a portion of the exterior surface thereon and the receiving opening 13R is an axial groove therein. In some embodiments, the second fastener 13 is a sleeve, such as an adapter sleeve, split sleeve, etc., with external shaft threads on a portion of the exterior surface 13T thereon and the receiving opening 13R is an axial slot extending therethrough. In some embodiments, the first fastener 8 is a nut with female threads 8T therein, as shown in FIG. 4. In some embodiments, the first fastener 8 is a collar, such as a shaft collar, collar clamp, etc., with female threads therein. In some embodiments, the first fastener 8 is a collar without female threads therein (i.e. the radially inward facing surface 8F has a smooth contour).

As shown in FIGS. 3-4, the first anti-tilt lobe 2C and the second anti-tilt lobe 2D of the locking plate 10 engage the exterior surface 13T of the second fastener 13 to prevent tilting of the locking plate 10 relative to the first fastener 8 and the second fastener 13. The second anti-tilt lobe 2D extends circumferentially to an adjacent one of the bolts 8S and a portion of the second anti-tilt lobe 2D extends radially inward of the adjacent bolt 8S to pin the second anti-tilt lobe 2D between the adjacent bolt 8S and the exterior surface 13T of the second fastener 13. The axial end 8E of the first fastener 8 includes one or more protrusions 8P that extend outward therefrom. The first anti-tilt lobe 2C extends circumferentially to an adjacent one of the protrusions 8P and a portion of the first anti-tilt lobe 2C extends radially inward of the adjacent protrusion 8P to pin the first anti-tilt lobe 2C between the adjacent protrusion 8P and the exterior surface 13T of the second fastener 13. In some embodiments, the one or more protrusions 8P are set screws.

As shown in FIGS. 5A, 5B, 6A, 6B, 8A, and 8B, a locking plate for a fastener locking arrangement is generally designated by the numeral 20. The locking plate 20 includes a body 21 that is defined by a first planar surface 21A and a second planar surface 21B that is opposite the first planar surface 21A. The body 21 has an arcuate shape that extends from a first lateral end 21C of the body 21 to a second lateral end 21D of the body 21 and extends from a radially inward facing edge 21F (e.g., a curved edge) of the body 21 to a radially outward facing curved edge 21E of the body 21. The first lateral end 21C and the second lateral end 21D each have convex contours such that the body 21 has rounded ends. The radially inward facing edge 21F (e.g., curved edge) has an inner arc length AL4. The inner arc length AL4 extends along the radially inward facing edge 21F from the first lateral end 21C to the second lateral end 21D. The radially outward facing edge 21E has an outer arc length AL5. The outer arc length AL5 extends along the radially outward facing edge 21E from the first lateral end 21C to the second lateral end 21D. One or more elongated curved openings 24 extend through the body 21 from the first planar surface 21A to the second planar surface 21B. An anti-rotation feature 27 extends radially inward from the radially inward facing edge 21F of the body 21. Although not shown in FIGS. 5A, 5B, 6A, 6B, 8A, and 8B, in some embodiments, the body 21 has the anti-tilt lobes located proximate the first lateral end 21C and the second lateral end 21D as discussed herein with reference to the locking plate 10 such that, when the locking plate 20 is incorporated into a fastener locking arrangement (such as the fastener locking arrangement 100 discussed herein), the anti-tilt lobes are configured to be pinned between the protrusion 8P and/or the bolt 8S of the first fastener 8 and the exterior surface 13T of the second fastener 13 to prevent tilting of the locking plate 20 relative to the first fastener 8 and the second fastener 13.

Figure 6A:
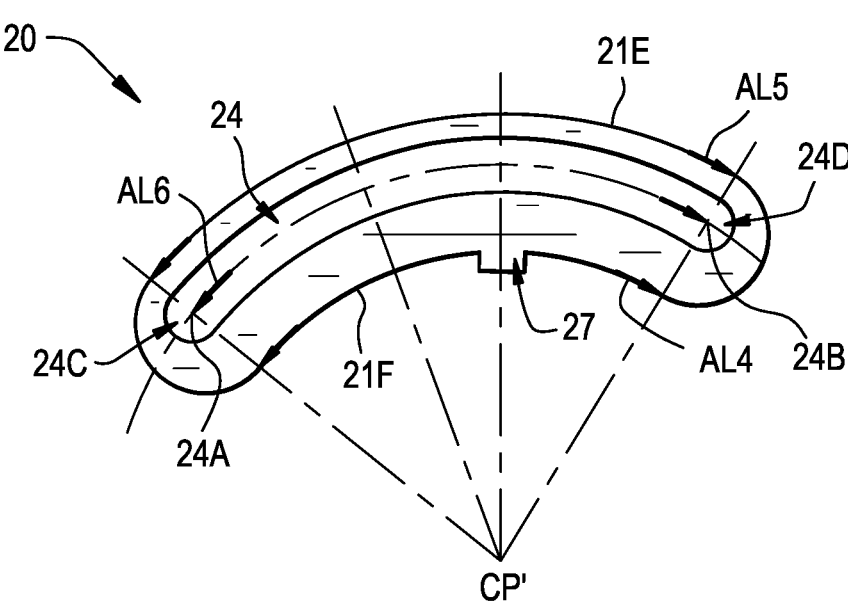
FIG. 6A is a plan view of a locking plate according to an embodiment of the present invention.
Figure 6B:
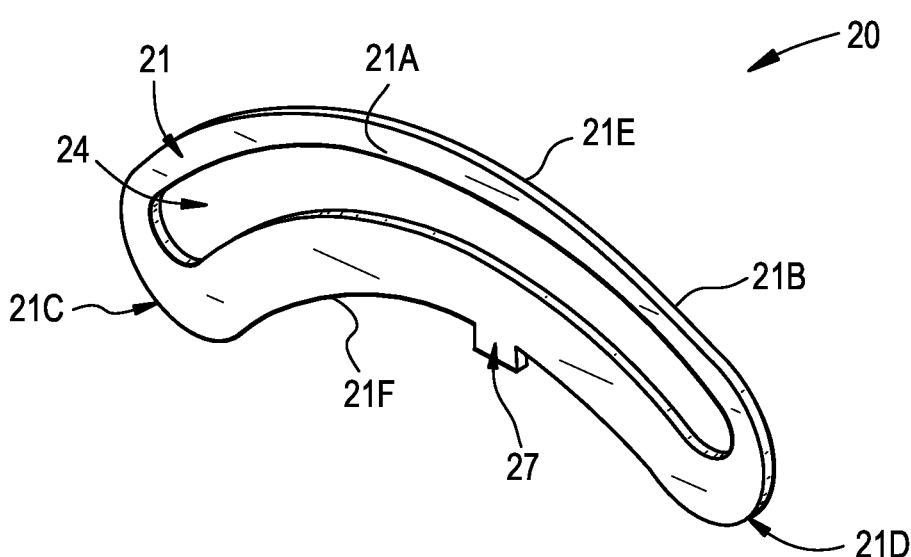
FIG. 6B is an isometric view of the locking plate of FIG. 6A.

As shown in FIGS. 6A-6B, a single elongated curved opening 24 extends through the body 21 from the first planar surface 21A to the second planar surface 21B. The elongated curved opening 24 extends an intermediate arc length AL6 in the body 21. The elongated curved opening 24 terminates in a first semicircle contour 24C, which has a first center point 24A, and terminates in a second semicircle contour 24D, which has a second center point 24B. The intermediate arc length AL6 of the elongated curved opening 24 is defined by a circumferential segment that extends between the first center point 24A of the first semicircle contour 24C and the second center point 24B of the second semicircle 24D. The intermediate arc length AL6 has a magnitude such that the elongated curved opening 24 spans substantially the entire length of the body 21. In some embodiments, the intermediate arc length AL6 has a magnitude such that the elongated curved opening 24 is long enough to only accommodate a single bolt 8S in the fastener locking arrangement 100 described herein. In some embodiments, the intermediate arc length AL6 has a magnitude such that the elongated curved opening 24 is long enough to accommodate two or more bolts 8S in the fastener locking arrangement 100 described herein.

Figure 5A:
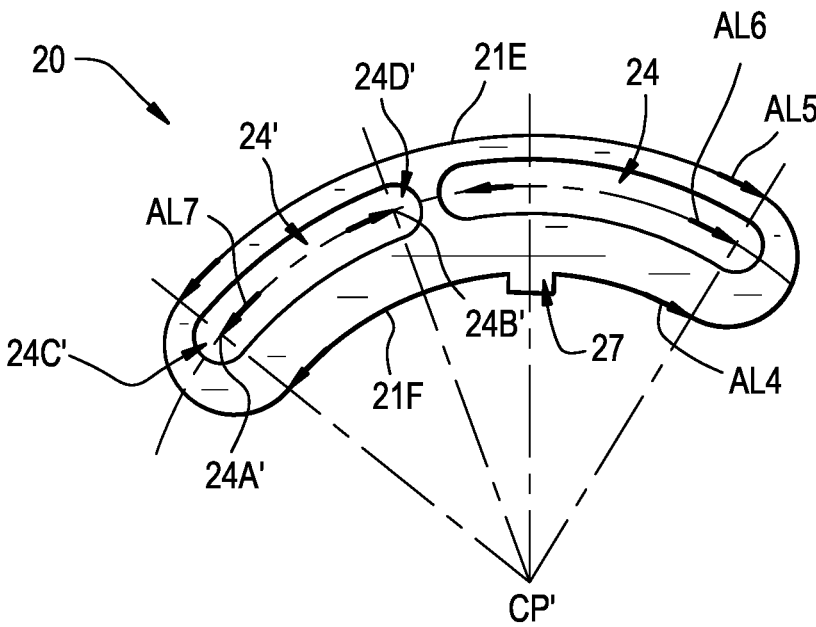
FIG. 5A is a plan view of a locking plate according to an embodiment of the present invention.
Figure 5B:
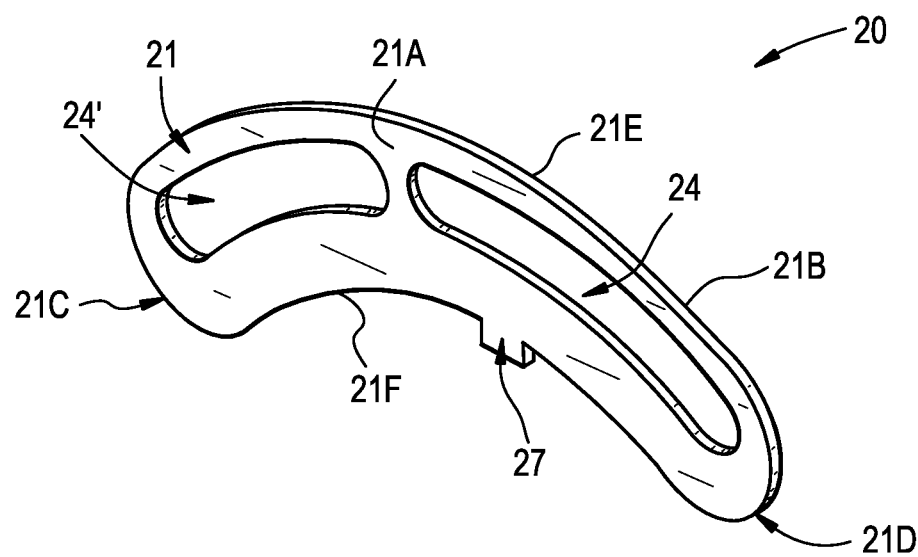
FIG. 5B is an isometric view of the locking plate of FIG. 5A.

As shown in FIGS. 5A-5B, a first elongated curved opening 24 and a second elongated curved opening 24' extend through the body 21 from the first planar surface 21A to the second planar surface 21B. The first elongated curved opening 24 extends the intermediate arc length AL6 in the body 21, as described above. The second elongated curved opening 24' extends an intermediate arc length AL7 in the body 21. The second elongated curved opening 24' terminates in a first semicircle contour 24C', which has a first center point 24A', and terminates in a second semicircle contour 24D', which has a second center point 24B'. The intermediate arc length AL7 of the second elongated curved opening 24' is defined by a circumferential segment that extends between the first center point 24A' of the first semicircle contour 24C' and the second center point 24B' of the second semicircle 24D'. The intermediate arc length AL6 and the intermediate arc length AL7 have different magnitudes such that the first elongated curved opening 24 and the second elongated curved opening 24' are asymmetrical along the length of the body 21.

Figure 8A:
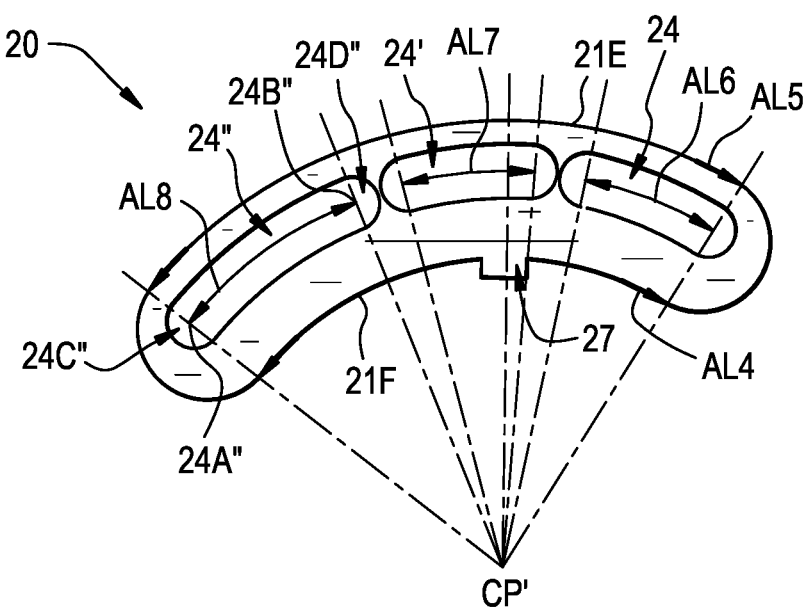
FIG. 8A is a plan view of a locking plate according to an embodiment of the present invention.
Figure 8B:
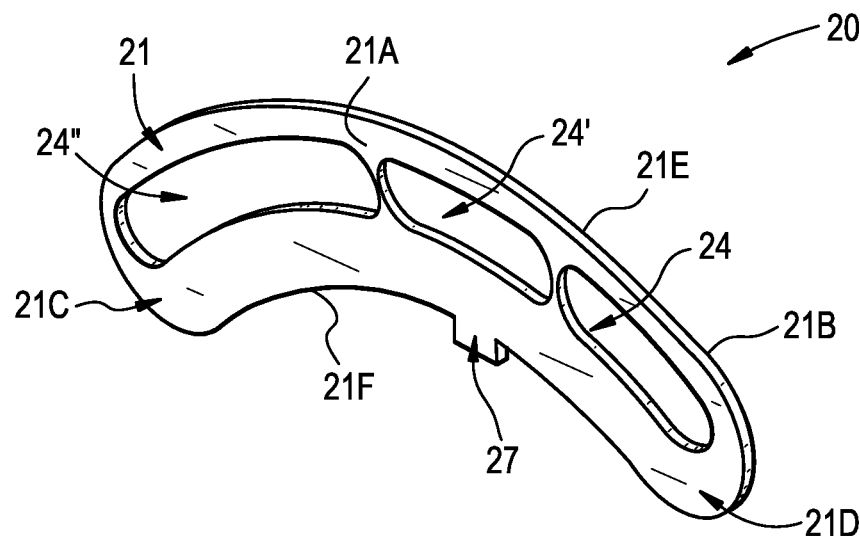
FIG. 8B is an isometric view of the locking plate of FIG. 8A.

As shown in FIGS. 8A-8B, a first elongated curved opening 24, a second elongated curved opening 24', and a third elongated curved opening 24" extend through the body 21 from the first planar surface 21A to the second planar surface 21B. The first elongated curved opening 24 extends the intermediate arc length AL6 in the body 21, as described above. The second elongated curved opening 24' extends the intermediate arc length AL7 in the body 21, as described above. The third elongated curved opening 24" extends an intermediate arc length AL8 in the body 21. The third elongated curved opening 24" terminates in a first semicircle contour 24C", which has a first center point 24A", and terminates in a second semicircle contour 24D", which has a second center point 24B". The intermediate arc length AL8 of the third elongated curved opening 24" is defined by a circumferential segment that extends between the first center point 24A" of the first semicircle contour 24C" and the second center point 24B" of the second semicircle 24D". One or more of the intermediate arc length AL6, the intermediate arc length AL7, and the intermediate arc length AL8 have different magnitudes such that the first elongated curved opening 24, the second elongated curved opening 24', and the third elongated curved opening 24" are asymmetrical along the length of the body 21.

As shown in FIGS. 5A, 6A, and 8A, the inner arc length AL4, the outer arc length AL5, and the intermediate arc lengths AL6, AL7, AL8 all share a common center point CP'. The anti-rotation feature 27 is aligned with one of the elongated curved openings 24, 24', 24".

Figure 7A:
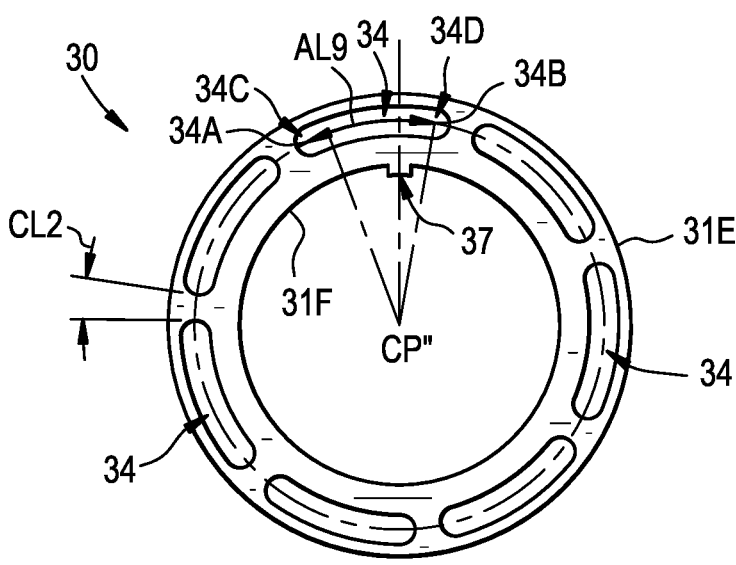
FIG. 7A is a plan view of a locking plate according to an embodiment of the present invention.
Figure 7B:
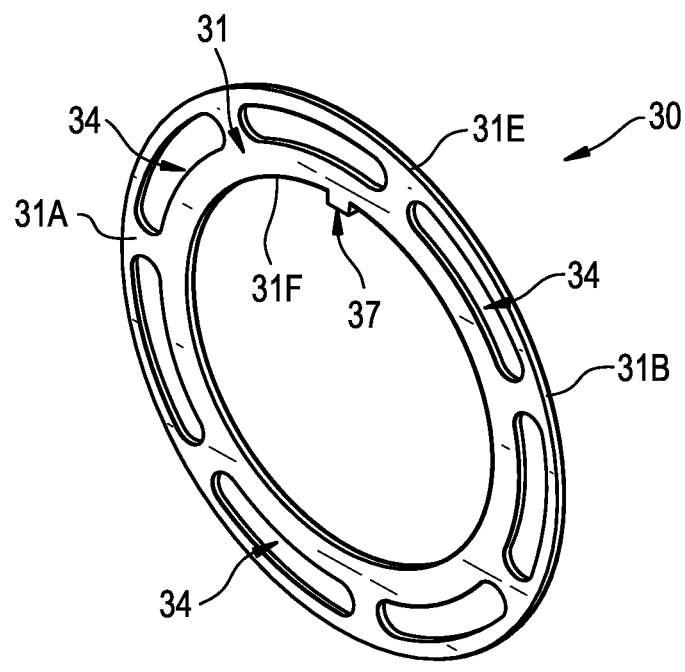
FIG. 7B is an isometric view of the locking plate of FIG. 7A.

As shown in FIGS. 7A-7B, a locking plate for a fastener locking arrangement is generally designated by the numeral 30. The locking plate 30 includes a body 31 that is defined by a first planar surface 31A and a second planar surface 31B that is opposite the first planar surface 31A. The body 31 has an annular shape that extends from a radially inward facing circular edge 31F of the body 31 to a radially outward facing circular edge 31E of the body 31. A plurality of elongated curved openings 34 extend through the body 31 from the first planar surface 31A to the second planar surface 31B. Each of the elongated curved openings 34 extends an intermediate arc length AL9 in the body 31. The elongated curved opening 34 terminates in a first semicircle contour 34C, which has a first center point 34A, and terminates in a second semicircle contour 34D, which has a second center point 34B. The intermediate arc length AL9 of the elongated curved opening 34 is defined by a circumferential segment that extends between the first center point 34A of the first semicircle contour 34C and the second center point 34B of the second semicircle 34D. The plurality of elongated curved openings 34 are evenly spaced along the circumference of the body 31. The elongated curved openings 34 are spaced apart from one another by a circumferential arc length CL2. The circumferential arc length CL2 is substantially less than the intermediate arc length AL9 of the elongated curved openings 34. In some embodiments, the intermediate arc length AL9 has a magnitude such that each elongated curved opening 34 is long enough to only accommodate a single bolt 8S in the fastener locking arrangement 100 described herein. In some embodiments, the intermediate arc length AL9 has a magnitude such that each elongated curved opening 34 is long enough to accommodate two or more bolts 8S in the fastener locking arrangement 100 described herein. The intermediate arc length AL9 and the body 31 share a common center point CP". An anti-rotation feature 37 extends radially inward from the radially inward facing circular edge 31F of the body 31. The anti-rotation feature 37 is aligned with one of the pluralities of elongated curved openings 34.

As will be apparent to those skilled in the art, various modifications, adaptations and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

References in the specification to "one embodiment," "an embodiment," "some embodiments," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about". The term "about" can refer to a variation of ±5%, +10%, +20%, or +25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A locking plate for a locking arrangement, the locking plate comprising:
a body defined by a first planar surface and a second planar surface opposite the first planar surface, the body having an arcuate shape having a radially inward facing edge, a radially outward facing edge, a first lateral facing edge, and a second lateral facing edge;
a single elongated curved opening extending through the body from the first planar surface to the second planar surface and extending an intermediate arc length in the body; and
an anti-rotation feature extending radially inward from the radially inward facing edge, wherein the body has an anti-tilt lobe located proximate at at least one of a first lateral end and a second lateral end, and
wherein the radially inward facing edge has an inner arc length and the radially outward facing edge has an outer arc length, the outer arc length being of a lesser magnitude than that of the inner arc length.

2. The locking plate of claim 1, wherein the anti-tilt lobe is at the first lateral end between the first lateral facing edge and the radially inward facing edge and/or the anti-tilt lobe is at the second lateral end between the second lateral facing edge and the radially inward facing edge.

3. The locking plate of claim 2, wherein at least one of:
(a) the inner arc length extends from the first lateral end to the second lateral end and a first reduced section extends from a first outer end to the first lateral end, wherein the first outer end is at an intersection of the first lateral facing edge and the radially outward facing edge; and
(b) the outer arc length extends from the first outer end to a second outer end and a second reduced section extends from the second outer end to the second lateral end, wherein the second outer end is at an intersection of the second lateral facing edge and the radially outward facing edge.

4. The locking plate of claim 1, wherein the elongated curved opening terminates in a first semicircle contour which has a first center point and terminates in a second semicircle contour which has a second center point.

5. The locking plate of claim 4, wherein the anti-rotation feature is aligned with the first center point of the elongated curved opening.

6. The locking plate of claim 4, wherein the intermediate arc length of the elongated curved opening is defined by a circumferential segment extending between the first center point of the first semicircle contour and the second center point of the second semicircle.

7. The locking plate of claim 6, wherein the body has an inner arc length along the radially inward facing edge from the first lateral end to the second lateral end and a ratio of the intermediate arc length of the elongated curved opening to the inner arc length is about 1.1 to about 1.4.

8. The locking plate of claim 4, wherein the anti-rotation feature is located between the first center point and the second center point.

9. The locking plate of claim 1, wherein the intermediate arc length of the elongated curved opening has a first radius of curvature of about 4 inches to about 14 inches and spans a first angle of about 25 degrees to about 35 degrees.

10. The locking plate of claim 1, wherein the body has an inner arc length along the radially inward facing edge from the first lateral end to the second lateral end and the inner arc length has a second radius of curvature of about 3.5 inches to about 11.5 inches and spans a second angle of about 75 degrees to about 95 degrees.

11. The locking plate of claim 1, wherein the radially outward facing edge has an outer arc length has a third radius of curvature of about 5.5 inches to about 15 inches and spans a third angle of about 25 degrees to about 35 degrees.

12. The locking plate of claim 1, wherein the intermediate arc length of the elongated curved opening spans an angle of about 25 degrees to about 35 degrees.

13. A locking arrangement comprising:
a locking plate of claim 1;
a first fastener having a bore extending therethrough, the bore being defined by a radially inward facing surface, the first fastener having an axial end with a plurality of circumferentially spaced holes extending through the axial end, at least one of the holes having a bolt extending therethrough and a single one of the bolts extending through the elongated curved opening of the locking plate such that the locking plate is secured between the bolt and the axial end; and
a second fastener having an exterior surface complementary in shape to the radially inward facing surface of the first fastener, the second fastener being disposed at least partially in the bore of the first fastener such that the exterior surface engages the radially inward facing surface, the exterior surface having a receiving opening extending axially therealong;
wherein the anti-rotation feature of the locking plate is positioned in the receiving opening for preventing movement of the first fastener relative to the second fastener.

14. The locking arrangement of claim 13, wherein the holes are spaced apart from one another by a circumferential arc length and the intermediate arc length of the locking plate is less than the circumferential arc length.

15. The locking arrangement of claim 13, wherein the radially inward facing edge engages the exterior surface of the second fastener.

16. The locking arrangement of claim 13, wherein the anti-tilt lobe engages the exterior surface of the second fastener to prevent tilting of the locking plate relative to the first fastener and the second fastener.

17. The locking arrangement of claim 13, wherein the anti-tilt lobe extends circumferentially to an adjacent one of the bolts and a portion of the anti-tilt lobe extends radially inward of the adjacent bolt to pin the anti-tilt lobe between the adjacent bolt and the exterior surface of the second fastener.

18. The locking arrangement of claim 13, wherein the first fastener is a nut with female threads therein.

19. The locking arrangement of claim 13, wherein the second fastener is one of:
(a) a shaft with external shaft threads thereon and the receiving opening is an axial groove therein; and
(b) a sleeve with external sleeve threads thereon and the receiving opening is an axial slot extending therethrough.

20. A locking plate for a locking arrangement, the locking plate comprising:
a body defined by a first planar surface and a second planar surface opposite the first planar surface, the body having an arcuate shape having a radially inward facing edge, a radially outward facing edge, a first lateral facing edge, and a second lateral facing edge, wherein the radially inward facing edge has an inner arc length and the radially outward facing edge has an outer arc length, the outer arc length being of a lesser magnitude than that of the inner arc length;
a single elongated curved opening extending through the body from the first planar surface to the second planar surface and extending an intermediate arc length in the body; and
an anti-rotation feature extending radially inward from the radially inward facing edge,
wherein the body has an anti-tilt lobe located proximate at at least one of a first lateral end and a second lateral end, the first lateral end being between the first lateral facing edge and the radially inward facing edge, the second lateral end being between the second lateral facing edge and the radially inward facing edge.

21. A locking plate for a locking arrangement, the locking plate comprising:
a body defined by a first planar surface and a second planar surface opposite the first planar surface, the body having an arcuate shape having a radially inward facing edge, a radially outward facing edge, a first lateral facing edge, and a second lateral facing edge;
a single elongated curved opening extending through the body from the first planar surface to the second planar surface and extending an intermediate arc length in the body, the single elongated curved opening terminating in a first semicircle contour which has a first center point and terminates in a second semicircle contour which has a second center point; and
an anti-rotation feature extending radially inward from the radially inward facing edge,
wherein the body has an anti-tilt lobe located proximate at at least one of a first lateral end and a second lateral end, the first lateral end being between the first lateral facing edge and the radially inward facing edge, the second lateral end being between the second lateral facing edge and the radially inward facing edge.

22. A locking plate for a locking arrangement, the locking plate comprising:
a body defined by a first planar surface and a second planar surface opposite the first planar surface, the body having an arcuate shape having a radially inward facing edge, a radially outward facing edge, a first lateral facing edge, and a second lateral facing edge;

a single elongated curved opening extending through the body from the first planar surface to the second planar surface and extending an intermediate arc length in the body; and an anti-rotation feature extending radially inward from the radially inward facing edge, wherein the body has an anti-tilt lobe located proximate at at least one of a first lateral end and a second lateral end, wherein the first lateral end is between the first lateral facing edge and the radially inward facing edge and the second lateral end is between the second lateral facing edge and the radially inward facing edge, wherein the intermediate arc length shares a common center point with an inner arc length of the radially inward facing edge and an outer arc length of the radially outward facing edge, and wherein the intermediate arc length of the elongated curved opening spans an angle of about 25 degrees to about 35 degrees.

23. A locking plate for a locking arrangement, the locking plate comprising:

a body defined by a first planar surface and a second planar surface opposite the first planar surface, the body having an arcuate shape having a radially inward facing edge, a radially outward facing edge, a first lateral facing edge, and a second lateral facing edge;

a single elongated curved opening extending through the body from the first planar surface to the second planar surface and extending an intermediate arc length in the body; and an anti-rotation feature extending radially inward from the radially inward facing edge, wherein the body has an anti-tilt lobe located proximate at at least one of a first lateral end and a second lateral end, wherein the first lateral end is between the first lateral facing edge and the radially inward facing edge and the second lateral end is between the second lateral facing edge and the radially inward facing edge, wherein the intermediate arc length shares a common center point with an inner arc length of the radially inward facing edge and an outer arc length of the radially outward facing edge, and wherein the radially inward facing edge has an inner arc length from the first lateral end to the second lateral end that spans an angle of about 75 degrees to about 95 degrees.

24. A locking plate for a locking arrangement, the locking plate comprising:

a body defined by a first planar surface and a second planar surface opposite the first planar surface, the body having an arcuate shape having a radially inward facing edge, a radially outward facing edge, a first lateral facing edge, and a second lateral facing edge;

a single elongated curved opening extending through the body from the first planar surface to the second planar surface and extending an intermediate arc length in the body; and an anti-rotation feature extending radially inward from the radially inward facing edge, wherein the body has an anti-tilt lobe located proximate at at least one of a first lateral end and a second lateral end, wherein the first lateral end is between the first lateral facing edge and the radially inward facing edge and the second lateral end is between the second lateral facing edge and the radially inward facing edge, wherein the intermediate arc length shares a common center point with an inner arc length of the radially inward facing edge and an outer arc length of the radially outward facing edge, and wherein the radially outward facing edge has an outer arc length from a first outer end to a second outer end that spans an angle of about 25 degrees to about 35 degrees, wherein the first outer end is at an intersection of the first lateral facing edge and the radially outward facing edge and the second outer end is at an intersection of the second lateral facing edge and the radially outward facing edge.

* * * * *